Figure 3:
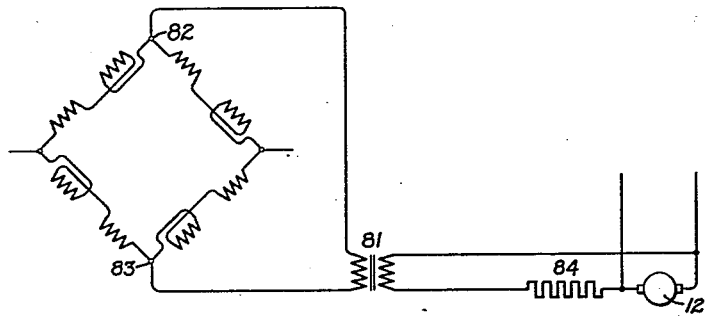

April 24, 1951  E. F. W. ALEXANDERSON  2,550,514
SYSTEM FOR REPRODUCING POSITION
Original Filed May 19, 1932  3 Sheets-Sheet 1
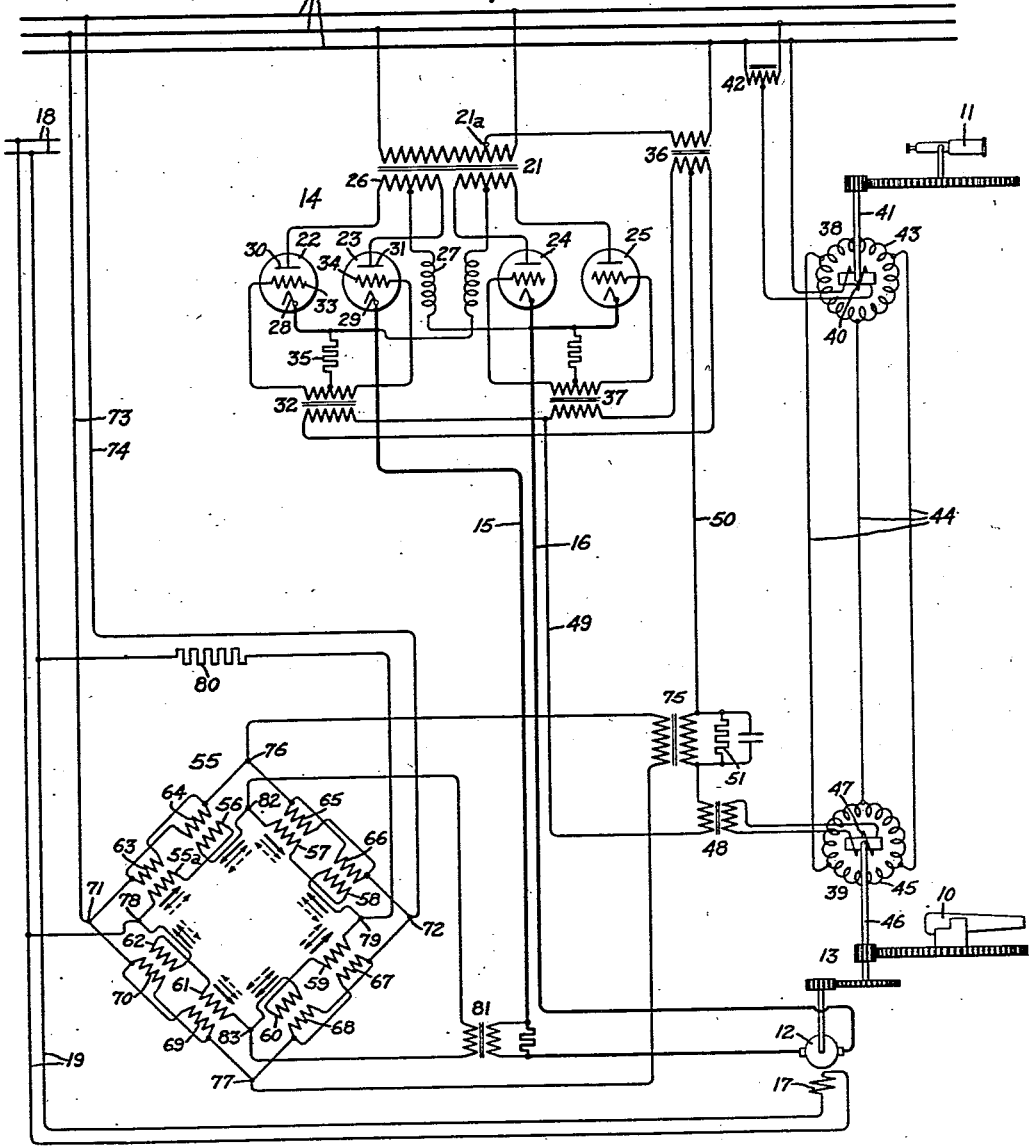
Fig. 1.
Fig. 2.
Inventor:
Ernst F. W. Alexanderson,
by Charles E. Tullar
His Attorney.

April 24, 1951  E. F. W. ALEXANDERSON  2,550,514
SYSTEM FOR REPRODUCING POSITION
Original Filed May 19, 1932  3 Sheets-Sheet 2

Inventor:
Ernst F. W. Alexanderson,
by Charles V. Fuller
His Attorney.

April 24, 1951  E. F. W. ALEXANDERSON  2,550,514
SYSTEM FOR REPRODUCING POSITION
Original Filed May 19, 1932  3 Sheets-Sheet 3
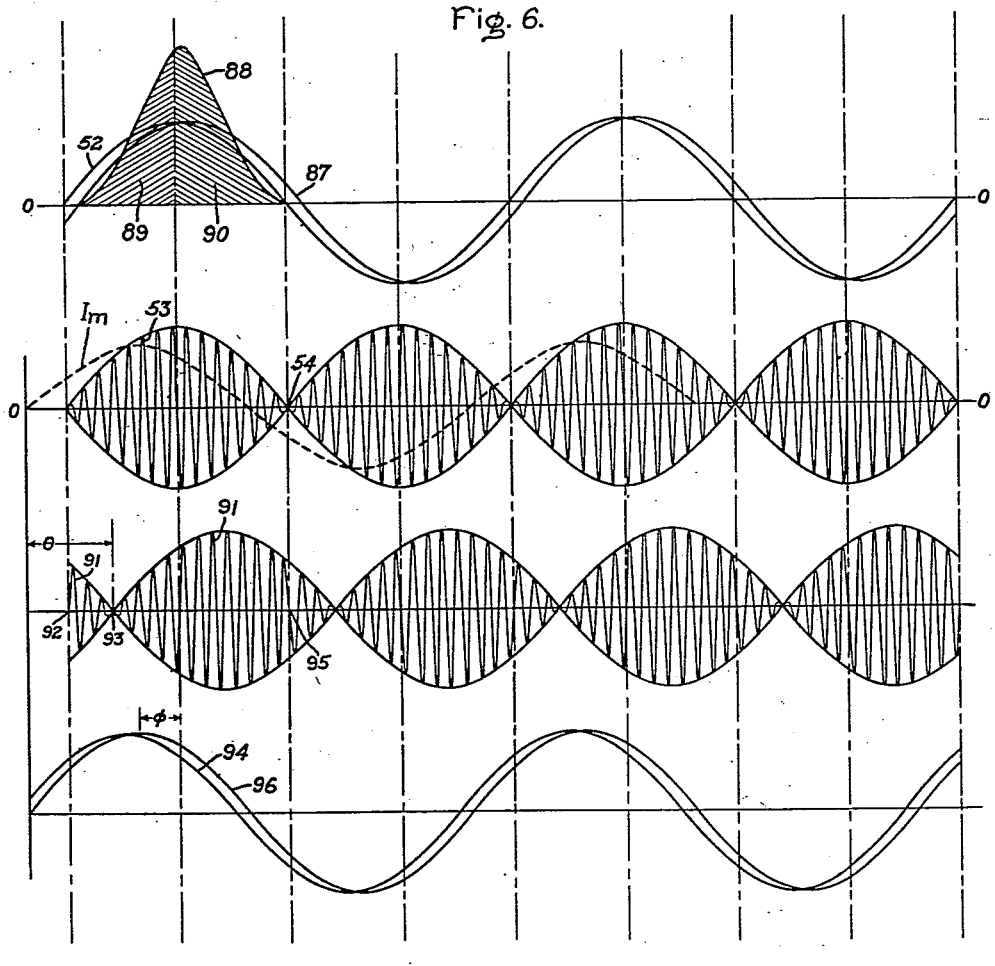
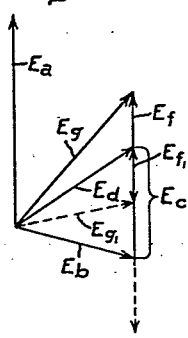
Inventor:
Ernst F. W. Alexanderson,
by Charles V. Tullar
His Attorney.

Patented Apr. 24, 1951

2,550,514

UNITED STATES PATENT OFFICE 2,550,514

SYSTEM FOR REPRODUCING POSITION

Ernst F. W. Alexanderson, Schenectady, N. Y., assignor to General Electric Company, a corporation of New York Application May 19, 1932, Serial No. 612,283

39 Claims. (Cl. 318—30)

This invention relates to systems in which a synchronizing force is exerted between a plurality of interconnected electrical devices, more particularly to systems in which a control object operates through suitable mechanism to drive another object into positional agreement with the control object, and it has for an object the provision of a simple, reliable and improved system of this character.

In another aspect, the invention relates to motor control systems in which a remote control object operates to control an electric motor to drive a second or controlled object into positional agreement with the controlling object.

In the operation of systems of the above character, conditions of hunting or oscillation are encountered which interfere with the satisfactory operation of the system. For example, in the system in which an electric motor is utilized to drive an object into positional agreement with the control object, there is a tendency for the driving motor to overrun the position of correspondence due to its own inertia as well as to the inertia of the controlled object and other moving parts of the system resulting in a tendency of the driven object to hunt or oscillate back and forth about the position of correspondence. The conditions leading to oscillation in such control systems will be understood from the following brief analysis in which the departure from correspondence is denoted by the symbol $s$. In a simple form, a system of this character is usually constituted so that the restoring force is proportional to this departure and this condition is mathematically expressed in the equation (1) $$F = -As$$

in which F represents the restoring force and A is the coefficient determining the sensitiveness of the control.

In every control, however, there is an element of time lag. For example, in electrical systems there is an inherent time lag factor due to the inductance of the controlling circuit. This time lag has the effect of temporarily decreasing the restoring force by delaying its application. The effect of the time lag is especially marked in follow-up systems involving rapid changes in motion. Now time lag is a function of velocity, that is to say, the first derivative of distance with respect to time or in mathematical terminology $$\frac{ds}{dt}$$

The correction term may be expressed as $$B\frac{ds}{dt}$$

in which the coefficient B is a measure of time lag, and the corrected equation for the restoring force is (2) $$F = -As + B\frac{ds}{dt}$$

This equation shows that the restoring force is greater when the motion is toward the point of correspondence than when it is away from the point of correspondence, thus resulting in a condition of continuous or even cumulative oscillations continuing indefinitely. This condition constitutes a difficulty in follow-up systems and accordingly a more specific object of this invention is the provision of means for overcoming the effect of this time lag by the substitution of a leading restoring force and thus anticipating the final position of correspondence in such a manner that the controlled object is brought to the position of correspondence with the control object with great precision and without any tendency to hunt or oscillate about the point of correspondence.

In carrying the invention into effect in one form thereof, changes in the torque or synchronizing force are utilized for modifying the synchronizing force in such a manner as to anticipate the final position and to bring the interconnected devices into correspondence without hunting or oscillation. In a system in which an electric motor is employed to drive an object into positional agreement with a control object, changes in the torque of the motor are so utilized.

In an embodiment of this invention, the necessary synchronizing force is produced by an electric current supplied from suitable electric valve apparatus provided with a control circuit to which an alternating voltage is supplied, and means responsive to changes in an electrical condition of the system are provided for controlling the phase and magnitude of this alternating voltage in such a manner as to anticipate the final position of the interconnected devices and bring them into positional agreement without oscillation.

In illustrating the invention in one form thereof, it is shown as applied to a system in which the movement of an object having large mass, such for example as a gun, is caused to follow the movement of a control or pilot device such as a telescope and in which it is desired that the bore of the gun shall be brought into positional agreement with the line of sight of the telescope accurately and without oscillation about the final position of correspondence. The invention is shown as applied to a gun-fire system because of the severe inherent conditions of oscillation due to the mass of the gun and the speed with which it is moved, thereby providing a system well adapted to illustrate the operation of the invention. It is to be understood, however, that the invention is not limited in its application to gun-fire control systems, in which it is shown merely for the purpose of illustration, but on the other hand that the invention is generally applicable to systems in which a synchronizing force is exerted between a plurality of interconnected devices, or to systems in which an object is driven into positional agreement with a pilot or control object.

Figure 4:
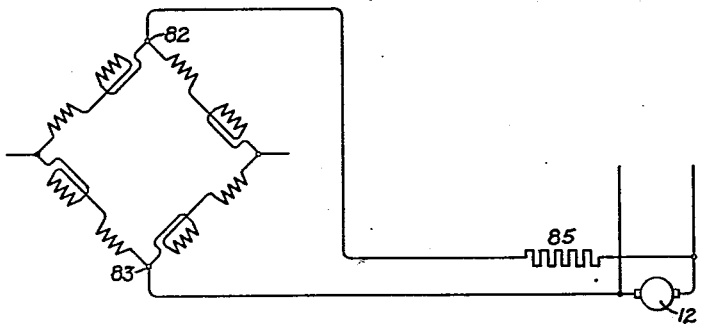
Figure 5:
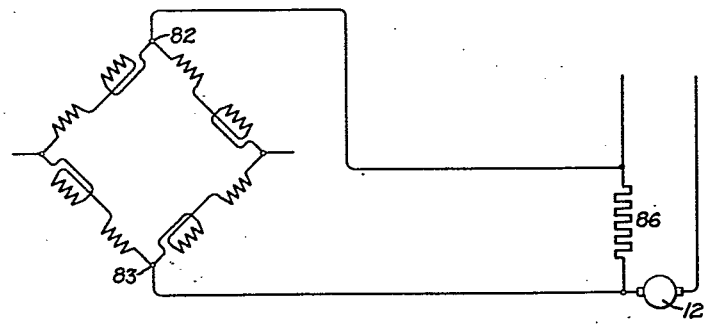

For a better and more complete understanding of the invention, reference should now be had to the following specification and to the accompanying drawing in which Fig. 1 is a simple diagrammatical representation of an embodiment of the invention as applied in a gun-fire control system; Fig. 2 is a detailed arrangement of certain elements of the embodiment shown in Fig. 1; Figs. 3, 4, and 5 are modifications; Fig. 6 is chart of characteristic curves serving to explain the operation of the invention; and Fig. 7 is vector diagram serving to explain the operation.

Referring now to the drawing, a gun 10 is arranged to be driven into a position of correspondence with a telescope 11 by suitable driving means illustrated as an electric motor 12, to the drive shaft of which the turn-table upon which the gun is mounted is mechanically connected by suitable reduction gearing 13. The motor 12 is illustrated as of the direct current type and is supplied with direct current from any suitable supply means such for example as that represented in the drawing by the electric valve apparatus 14 to the output circuit of which the armature of the motor is connected by means of conductors 15 and 16. As shown, the motor 12 is also provided with a direct current field winding 17 supplied from a suitable separate source, such for example as that represented in the drawing by the two supply lines 18 and to which source the terminals of the field winding 17 are connected by means of conductors 19.

The electric valve apparatus 14 from which the armature of the motor 12 is supplied is in turn supplied from a suitable source of alternating current such for example as that represented in the drawing by the three supply lines 20 to the top and middle lines of which the electric valve apparatus is connected by means of a power transformer 21. The electric valve apparatus 14 is shown as comprising a pair of electric discharge devices 22 and 23 for supplying current to the armature of the motor 12 for rotation in one direction and a pair of electric discharge devices 24 and 25 for supplying current to the armature of the motor 12 for rotation in the reverse direction. Although the electric discharge devices may be of any suitable type, they are preferably of the three-electrode type into the envelope of which a small quantity of an inert gas, such for example as mercury vapor, is introduced after exhaust. The presence of the gas within the tube serves to convert the usual electronic discharge into an arc stream thus constituting the tube an electrostatically or grid controlled arc rectifier, the average value of the current flowing in the output circuit of which may be varied or controlled as desired by varying the phase relationship between the voltages applied to the control grid and anode of these devices. As shown, the pair of electric discharge devices 22 and 23 and the pair of electric discharge devices 24 and 25 are provided with output circuits connected for full-wave rectification of the single-phase voltage derived from the top and middle supply lines 20; the output circuit of the pair of electric discharge devices 22 and 23 extending from the mid-point of the secondary winding 26 of the anode transformer through the smoothing reactance coil 27 to the motor supply conductor 16 and from the motor supply conductor 15 to the cathodes 28 and 29 in parallel respectively, the plates or anodes 30 and 31 respectively, and thence to the terminals of the secondary winding 26 and the pair of electric discharge devices 24 and 25 being provided with a similar circuit as illustrated. For the purpose of controlling the output current supplied to the armature of the driving motor 12, the electric valve apparatus is provided with a suitable control circuit; that for the pair of electric discharge devices 22 and 23 extending from the terminals of the secondary winding of the grid transformer 32 to the grids 33 and 34 respectively in parallel, the cathodes 28 and 29 respectively and thence through the protective resistance 35 to the mid-point of the secondary winding of the grid transformer 32. The pair of electric discharge devices 24 and 25 is provided with a similar grid control circuit as shown. Voltage is supplied to these control circuits from the source 20 by means of a grid supply transformer 36, the secondary winding of which is connected to the primary windings of the grid transformers 32 and 37 and the primary winding of which is connected from the lower supply line 20 to an intermediate point 21a of the primary winding of the power supply transformer 21. This intermediate tap connection provides an initial phase displacement or bias of the grid voltage with respect to the anode voltage which will be clearly understood by reference to Fig. 7 of the drawing in which the vector $E_a$ represents the voltage supplied to the anodes of the electric discharge devices and the vector $E_b$ represents the voltage supplied through the transformer 36 to the grid, whilst the angle between these two vectors represents the phase relationship between these voltages. When the grid voltage is substantially in phase with the anode voltage the average current flowing in the output circuit has its maximum value whilst when the phase angle between these voltages is increased the value of the current in the output circuit decreases until when the phase relationship between these voltages is as shown in Fig. 7 substantially no current flows in the output circuit. It will be understood of course that even with a phase relationship between the grid and anode voltages as shown in Fig. 7 that some circulating current is present in the system and flows from one pair of electric discharge devices to the other through the smoothing reactances. This circulating current, however, does not flow in the motor circuit.

In order to control the magnitude and direction of the current supplied to the motor 12 from the electric valve apparatus in accordance with the angular displacement between the telescope 11 and the gun 10, a synchronism indicator, shown as comprising an inductive device 38 actuated by the telescope and a similar inductive device 39 actuated by the gun is provided for the purpose of controlling or modifying the voltage supplied to the control circuit of the electric valve apparatus. The inductive device 38, referred to as the pilot device, comprises a rotor winding 40 non-rotatably mounted upon a shaft 41 which is connected through suitable gearing to the turn-table upon which the telescope is mounted. This winding is arranged to be supplied with single-phase voltage from the source 20, the lower supply line of which is connected to one terminal of the winding 40 and the opposite terminal of which winding is connected to a mid-tap of an inductive winding 42, the terminals of which are connected across the lower and middle supply line 20. The purpose of this mid-tap connection on the winding 42 is to provide a slight phase displacement in the voltage supplied to the rotor winding 40 to compensate for the inductance in the synchronism indicator system. Upon the stator of the pilot device 38 is wound a polyphase winding 43 which is interconnected by means of the conductors 44 with a like winding 45 arranged on the stator member of the inductive device 39, the rotor member of which is mounted on a shaft 46 mechanically coupled to the gun platform by means of gearing having the same ratio as the gearing between the shaft 41 of the pilot device and the telescope turn-table. As shown in the drawing, the rotor member of the inductive device 39 is provided with a winding 47, the terminals of which are connected to the terminals of the primary winding of a control transformer 48, the terminals of the secondary winding of which are respectively connected to the mid-point between the primary windings of the grid transformers 32 and 37 by means of a conductor 49 and to the mid-point of the secondary winding of the grid supply transformer 36 by means of a conductor 50. A current limiting resistance 51 is included in circuit between the secondary winding of the control transformer 48 and the mid-point of the grid supply transformer 36.

The inductive devices 38 and 39 are of a type commonly used for reproducing motion or position at a distance. In the present case, however, these devices are utilized for the purpose of producing an alternating voltage, the value of which is substantially proportional to the angular displacement between the telescope and the gun. With this arrangement single phase voltage applied to the rotor winding 40 of the device 38 produces in the device 38 an alternating magnetic field having a position in space that is determined by the position of this winding, and due to the interconnection of the windings 43 and 45 there is produced in the device 39 a similar alternating magnetic field having a corresponding position in space. The voltage induced in the rotor winding 47 by this field is zero when the winding 47 is at right angles to the field and is in maximum when the axis of the magnetic field and the axis of the coil coincide. Since the telescope 11 is mounted to rotate with the rotor coil 40 of the pilot device and the gun 10 is mounted to rotate with the rotor coil 47 of the receiving device, a change in the angular relation existing between the telescope and the gun will produce in the coil 47 a voltage, the effective value of which is proportional to and the phase of which is dependent upon the direction of this departure from correspondence. The connections between the rotor winding 47 and the primary of the control transformer 48 are so chosen that this voltage is impressed upon the control circuit of the electric valve apparatus as represented by the vector $E_c$ in Fig. 7 substantially in phase with the anode voltage $E_a$.

The manner in which this voltage functions to control the current supplied to the motor 12 will be clear by referring to Fig. 6 in which the curve 52, the ordinates of which above the line O—O represent departure from correspondence between the gun 10 and the telescope 11 in one direction and the ordinates below the line O—O represent departure from correspondence in the opposite direction, is plotted with respect to time as abscissae and by further reference to the curve 53 in which positive and negative ordinates with respect to the line O—O respectively represent positive and negative voltages is plotted with respect to time as abscissae. As the gun departs from correspondence with the telescope 11 in one direction, the magnitude of the voltage increases to a maximum when the departure is maximum and again decreases to zero when the gun returns to the position of correspondence with the telescope. Similarly when the gun passes through the position of correspondence and departs in the opposite direction the voltage again increases to a maximum and decreases to zero as the gun passes through the positions of maximum departure and correspondence respectively. It will be noticed, however, that as the gun passes through the position of correspondence the phase of the voltage represented by the curve 53 is reversed which is indicated in the drawing by the fact that the voltage represented by the negative half-cycle near the point 54 does not pass through zero at this point to attain a positive value, but instead, again attains a negative value and then continues to attain positive and negative values in the usual manner. Referring again to Fig. 7, when the departure of the gun from correspondence with the telescope is maximum in one direction as represented by curve 52, the voltage represented by the vector $E_c$ is maximum with result that the resultant voltage represented by the vector $E_d$ applied to the control circuit of the electric valve apparatus is moved closer to the in-phase position with the anode voltage $E_a$ with the result that current is supplied to the motor 12 in a direction such as to cause the motor to return the gun to the position of correspondence with the telescope. As the departure decreases, the magnitude of the voltage represented by the vector $E_c$ likewise decreases with the result that the vector $E_d$ moves in a clockwise direction until when the gun and telescope are again in correspondence, the position of the vector $E_d$ coincides with that of the vector $E_b$ with the result that the pair of electric discharge devices supplies no current to the motor. Similarly when the gun passes through correspondence to a position of departure in the opposite direction, the phase of the voltage represented by the vector $E_c$ is reversed so that it occupies a position exactly 180° out of phase with its previous position as represented by the dotted vector in Fig. 7. In this position, the phase of the voltage applied to the other pair of electric discharge devices is advanced with respect to the anode voltage thereby causing current to be supplied to the motor 12 in the opposite direction.

In order to prevent the gun 10 from hunting or oscillating about the position of correspondence with the telescope 11, anti-hunting means 55 are provided for modifying or controlling the voltage applied to the control circuit of the electric valve apparatus 14 in accordance with transient conditions in the system. The anti-hunting means 55 is shown as comprising a magnetic saturable core reactor having a plurality of direct current control windings 55a, 56, 57, 58, 59, 60, 61, and 62 and a corresponding plurality of alternating current reactive windings 63, 64, 65, 66, 67, 68, 69, and 70 inductively related with the corresponding direct current control windings respectively as indicated in the drawing. As shown the direct current control windings 55a–62 inclusive are connected in the form of a bridge, each arm of which comprises a pair of windings connected in series relationship with each other whilst the reactive windings 63–70 inclusive are likewise connected in the form of a bridge, each arm of which comprises a pair of windings connected in parallel. The arrangement of the coils of the anti-hunting device is shown in Fig. 2 in which it will be observed that coils 55a and 63 are mounted on the same core with coils 59 and 67 located diagonally across the anti-hunting square. The remaining coils are similarly arranged and the arrangement will be clearly understood from the enumeration applied to the coils both in Figs. 1 and 2.

The reactance winding bridge comprising the coils 63–70 inclusive is supplied with an alternating voltage from any suitable source such for example as the middle and top supply lines of the polyphase source 20 to which the opposite diagonals 71 and 72 of this bridge are respectively connected by the conductors 73 and 74 whilst the other diagonal of the reactance winding bridge is connected to the control circuit of the electric valve apparatus 14 through a transformer 75 to the terminals of the secondary winding of which the diagonal points 76 and 77 of the reactance winding bridge are respectively connected. A direct current voltage is supplied to the direct current control winding bridge comprising the coils 55a–62 inclusive from any suitable source such for example as the source 18 to which the opposite diagonal points 78 and 79 are connected with a current limiting resistance 80 included in circuit therewith, whilst the remaining diagonal of the control winding bridge is connected to the motor circuit through a transformer 81 to the terminals of the secondary winding of which the diagonal points 82 and 83 are connected as shown. The direct current supplied from the source 18 flows through the coils of the direct current control winding bridge in the direction represented by the heavy arrows and produces a magnetization of these coils, the direction of which is also represented by these arrows. When no voltage is supplied from the motor circuit to the diagonal points 82, 83 the bridge is magnetically balanced and although the bridge points 71, 72 are connected to a source of alternating voltage, the bridge points 76, 77 are equipotential points due to the magnetic balance of the bridge with the result that no alternating voltage is supplied from the points 76, 77 to the control circuit of the electric valve apparatus.

Since a direct current is supplied from the electric valve apparatus to the motor 12, no voltage is induced in the secondary winding of the transformer 81 when the current in the motor circuit is steady. However, when the current is changing a voltage is induced in the secondary winding of the transformer 81 and applied to the diagonal points 82, 83 of the direct current control winding bridge. When the current is changing in one direction, the voltage applied to the points 82, 83 causes a direct current to flow in the direct current control windings in directions represented by the light arrows and also produces magnetization of these windings, the directions of which are also represented by these light arrows.

It will be observed that in the coils 55a, 56, 59, and 60 the current flowing due to the voltage induced in the secondary of the transformer 81 is in the opposite direction with respect to the direction of the current supplied to these coils from the source 18 whereas in the coils 57, 58, 61, and 62 the currents are in the same direction resulting in a decrease in the magnetization of coils 55a, 56, 59, and 60 and an increase in the magnetization of coils 57, 58, 61, and 62. This decrease in the magnetization of the upper left and lower right arms of the bridge and increase in the magnetization of the lower left and upper right arms of the bridge produces a magnetic unbalance with the result that the points 76 and 77 of the reactance winding bridge are no longer equipotential points thus causing an alternating voltage to appear at these points, the magnitude of which varies with the magnitude of the change of motor current and the frequency of which is equal to that of the source 20. This alternating voltage is applied to the control circuit of the electric valve apparatus 14 through the transformer 75 so that it is substantially in phase with the anode voltage $E_a$ as represented in Fig. 7 by the vector $E_f$.

Similarly when the motor current is in the opposite direction and changing, voltage is applied to the bridge points 82, 83 in the opposite direction causing current to flow in the direct current control windings 55a–62 inclusive and producing magnetization of these windings in the opposite directions as represented by the dotted arrows thereby causing the bridge to be magnetically unbalanced in the opposite direction and causing the phase of the alternating voltage applied to the control circuit to be reversed as indicated by the reverse vector $E_{f1}$ in Fig. 7. When the motor current is changing in the first mentioned direction the voltage, applied to the control circuit of the electric valve apparatus, is the vectoral sum of the voltages $E_b$, $E_c$, and $E_f$ which is represented in Fig. 7 by the vector $E_g$, the phase of which with respect to the anode voltage is such as to cause a large current to flow in the motor circuit and similarly when the motor current is changing in the opposite direction the voltage applied to the grid circuit is represented by the dotted vector $E_{g1}$, the phase of which with respect to the anode voltage is such as to cause a very small current to be supplied to the motor.

Thus it will be seen that a change in the direction of rotation of the motor 10 produces a change or a reversal of the phase of the voltage supplied from the anti-hunting device to the control circuit of the electric valve apparatus. Furthermore, it will be observed that since the direct current control winding bridge is connected to the motor circuit through a transformer that the anti-hunting means 55 is responsive only to changes in the motor current and since the voltage which it supplies to the control circuit for the electric valve apparatus is roughly proportional to the motor current, the anti-hunting means 55 is in this sense responsive to the rate of change of motor current and since the motor current is a measure of its torque, the anti-hunting means is thus responsive to rate of change of torque. It is also to be noted that the voltage supplied to the control circuit of the electric valve apparatus is composed of the voltage supplied from the anti-hunting means combined with the voltage of the indicating inductive device 39 and the alternating current bias supplied through the transformer 36 and the connections for supplying these voltages are made so that the anti-hunting and indicating voltages are in phase with each other and with the anode voltage and in quadrature with the grid bias voltage.

The modification shown in Fig. 3 of the drawing is in all respects identical with the system of Fig. 1 with the exception that the primary winding of the transformer 81 is connected to the terminals of the motor armature 12 with a current limiting resistance 84 in circuit therewith so that the voltage applied to the bridge points 82, 83 of the direct current control winding of the anti-hunting means is proportional to the rate of change of motor speed, which is represented by the mathematical term $$\frac{d^2s}{dt^2}$$

This term will be recognized as the mathematical expression for acceleration, i. e., rate of change of distance with respect to time and since acceleration is a function of the torque of the motor, it will be seen that the anti-hunting means is responsive to acceleration or to motor torque. Since the bridge points 82, 83 are connected to the terminals of the motor 12 through a transformer, no voltage is induced in the secondary winding of the transformer 81 when the motor speed is constant and thus, the anti-hunting means is responsive only to change of speed, i. e., acceleration or torque. In this modification the voltage supplied by the anti-hunting means to the control circuit for the electric valve apparatus is proportional to the magnitude of the change of speed, i. e., acceleration or torque and also functions as does the system of Fig. 1 to reverse the phase of this voltage with respect to that of the anode voltage. This reversal of phase, however, is in response to change in the direction of the acceleration or torque.

In the modification of Fig. 4 the direct current control winding bridge points 82, 83 are directly connected to the terminals of the motor armature 12 with a current limiting resistance 85 in circuit therewith. Thus, a voltage proportional to the speed of the motor 12 is applied to the bridge points 82, 83 with the result that the anti-hunting means is responsive to the speed of the motor and thus functions to supply a voltage to the control circuit of the electric valve apparatus proportional to the motor speed and to reverse the phase of this voltage when the polarity of the motor terminal voltage changes, i. e., when the direction of rotation of the motor changes.

In the modification of Fig. 5, the direct current control winding bridge points 82 and 83 are connected to the terminals of a resistance device 86 included in circuit with the motor armature 12 so that the voltage applied to the points 82, 83 is proportional to the voltage drop across the resistance 86 which in turn is proportional to the magnitude of the motor current. Consequently the voltage supplied by the anti-hunting means to the control circuit for the electric valve apparatus is proportional to the motor current. Since the motor current is proportional to the torque of the motor it will thus be seen that the anti-hunting means responds to the torque of the motor. When the direction of the motor current or torque changes, the anti-hunting means functions as in the other modifications to reverse the phase of the voltage supplied to the control circuit of the electric valve apparatus.

With the above understanding of the elements and apparatus and their organization in the completed system, the operation of the system itself will readily and easily be understood from the detailed description which follows. Assuming the system to be at rest the system is started in operation by moving the telescope 11 about its vertical axis of rotation. The rotation of the telescope 11 produces a rotation of the rotor of the inductive device 38 thereby causing a voltage to be induced in the rotor winding 47 of the indicating device 39 which voltage is supplied through the transformer 48 and applied to the control circuit of the electric valve apparatus 14 in phase with the anode voltage applied to one or the other of the pairs of electric discharge devices 22, 23 or 24, 25 depending upon the direction with which the telescope 11 is moved with respect to the gun 10. Assuming that the telescope 11 is moved in such a direction that the voltage is applied in phase with the anode voltage of the electric discharge devices 22, 23, current is supplied to the armature of the motor 12 in such a direction as to cause the motor to drive the gun 10 toward a position of correspondence with the telescope 11, whilst if the telescope is moved in the opposite direction the voltage supplied to the control circuit is in phase with the anode voltage of the electric discharge devices 24, 25 and current is supplied to the motor armature 12 in the reverse direction and the gun 10 driven toward a position of correspondence with the telescope 11.

The magnitude of the voltage applied to the control circuit through the transformer 48 is proportional to the departure of the telescope 11 from correspondence with the gun 10. Thus by referring to Fig. 7 it will be seen that the greater this departure from correspondence, the greater will be the magnitude of the control voltage as represented by the vector $E_c$ with the result that the actual voltage applied to the control circuit as represented by the vector $E_d$ is moved toward the in-phase position with the anode voltage $E_a$ thereby increasing the current flowing in the motor circuit whilst as the departure from correspondence decreases, the voltage represented by the vector $E_c$ decreases with the result that the actual voltage applied to the grids of the electric discharge devices and the vector $E_d$ is moved toward the out-of-phase position with respect to the anode voltage until when the telescope 11 and the gun 10 are in exact correspondence the voltage applied to the grid is represented by the vector $E_b$, the phase relationship of which with respect to the anode voltage is such as to cut off the supply of current to the motor 12.

If no means are provided for stopping the motor 12 when the gun 10 is in a position of exact correspondence with the telescope 11, the gun will be driven through the position of correspondence and the control will function in the above-described manner to supply current to the motor in the reverse direction so as to cause the gun to be returned to the position of correspondence, with the result that the gun 10 will again be driven through the position of correspondence in the reverse direction. The conditions leading to the gun 10 oscillating or hunting about the point of correspondence with the telescope will be readily understood by referring to the curve 52 of Fig. 6, the positive and negative ordinates of which respectively represent departure from correspondence in respectively opposite directions plotted with respect to the abscissae time. The current flowing in the motor circuit is represented by the curve 87 in which the positive and negative ordinates respectively represent positive and negative values of motor current plotted with respect to the abscissae time. Due to the inductance in the control circuit the motor current 87 lags with respect to the positional departure of the gun 10 and the telescope 11 as represented in Fig. 6 in which the curve 87 is clearly shown lagging the curve 52. The integral of the product of the motor current and the difference or departure from correspondence is a measure of the energy expended in the system and by integrating the product of the curves 52 and 87, a curve 88 is obtained representing the integral of this product. It will be observed that during the first quarter cycle of the deviation of correspondence, i. e., when the gun 10 is moving away from correspondence, the integral of this energy is represented by the shaded portion 89 of the curve whilst during the second quarter cycle of this deviation, i. e., when the gun is moving toward correspondence, the integral of this energy is represented by the shaded portion 90 of the curve. Thus it will be seen that more energy is expended when the motion is toward correspondence than when away from correspondence with the result that this process is repeated and the gun caused to hunt about the position of correspondence in a series of oscillations which may continue indefinitely or even become cumulative. The disadvantage of such a condition will readily be apparent since it is clear that the chances are considerably against the gun being fired while in the position of correspondence of the telescope 11.

This invention overcomes and eliminates hunting by causing the motor current 87 to be leading with respect to the departure from correspondence.

The manner in which the invention functions to prevent hunting or oscillating will best be understood by assuming the system to be oscillating around the point of correspondence as represented by the curve 52 in Fig. 6, and by assuming the final condition of a motor current leading the positional departure of the gun and telescope as represented by the dotted curve $I_m$. This assumption is warranted since the anti-hunting means responds to the current actually flowing. The voltage supplied through the synchronism indicating system and the transformer 48 to the control circuit of the electric valve apparatus is represented by the curve 53 and also in the vector diagram of Fig. 7 by the vector $E_c$. It will be observed in Fig. 6 that the frequency of this voltage is high with respect to the period of oscillation, i. e., it may be in the neighborhood of the usual sixty cycle commercial frequency whereas the period of oscillation is low and is for example in the nature of four or five cycles per second.

It will also be observed that at the points of correspondence this voltage is zero and that its magnitude increases with increases in the departure from correspondence. Thus when the departure from correspondence is the greatest, this voltage as represented by the vector $E_c$ is greatest and the resultant grid voltage $E_d$ of the electric valve apparatus is changed toward a position in phase with the anode voltage and the motor current is greatest whereas in the position of correspondence this voltage is zero and the resultant grid voltage is out-of-phase with the anode voltage as represented by the vector $E_b$. As a result, the voltage $E_c$ supplied from the synchronism indicating system tends to cut off the motor current at the points of correspondence.

As the motor current increases when the gun swings away from correspondence a voltage is induced in the secondary winding of the transformer 81 thus producing a magnetic unbalance of the bridge and causing a voltage to appear at the bridge points 76, 77 which is applied to the control circuit of the electric valve apparatus through the transformer 75, the frequency of which is equal to that of the voltage represented by the curve 53 and the magnitude of which increases and decreases in regular cycles having a frequency equal to the oscillating frequency of the system as represented by the curve 91 of Fig. 6. Due to the fact that the alternating current reactive coils of each arm of the bridge are short circuited upon each other, the anti-hunting means functions as a transformer with a short-circuited secondary, the large inductance of which causes the direct current magnetization to be considerably lagging with respect to the changes in motor current. This is represented in Fig. 6 of the drawing by showing that the envelope enclosing the cycles of increasing and decreasing magnitude of the voltage represented by the curve 91 lags the assumed motor current $I_m$ by the angle $\theta$.

As previously mentioned the voltage supplied from the anti-hunting square to the control circuit of the electric valve apparatus is represented in Fig. 7 of the drawing by the vector $E_f$. During the first portion of the departure, particularly between the points 92 and 93, the voltages represented by the curves 53 and 91 are in phase with each other and are adding which condition is represented in Fig. 7 by the vectors $E_c$ and $E_f$ in phase with each other and adding so that the resultant voltage applied to the control circuit is represented by the vector $E_g$ close to the in-phase position with the anode voltage $E_a$ causing a large voltage to be supplied to the motor. The addition of the voltages represented by the curves 53 and 91 is shown by the curve 94 which merely represents the envelope enclosing the maximum values of the curve obtained by adding the curves 53 and 91.

It will thus be seen that the voltage represented by the curve 94 attains its maximum value considerably before the instant at which the departure from correspondence becomes maximum with the result that the vector $E_g$ is nearest the in-phase position of the vector $E_a$ and maximum current is supplied to the motor at this instant. At the point 93 the phase of the voltage 91 is reversed with respect to that of the voltage 53 due to the change in the magnetic balance of the bridge produced by the reversal of the motor current as previously described. This condition is represented in Fig. 7 by the vector $E_h$, shown in reverse phase relationship, i. e., 180° out of phase with its prior position. Consequently from the point 93 to the point 95 the voltages represented by the curves 53 and 91 are subtracting as evidenced by the fact that the sum of these voltages as represented by the curve 94 is shown as decreasing between these points and even passing through zero prior to the point 95 at which point the gun is again in correspondence with the telescope 11. It will thus be seen that when the voltage represented by the curve 94 is maximum that the voltage represented by vector $E_g$ supplied to the control circuit of the electric valve apparatus is nearest the in-phase position with the anode voltage and the current supplied to the motor is maximum, whilst when this voltage is minimum the voltage applied to the control circuit of the electric valve apparatus is furthest out of phase with the anode voltage as shown by the dotted vector $E_{g1}$ and the current supplied to the motor armature is zero as represented by the curve 96 which due to the inductance of the motor circuit is slightly lagging with respect to the voltage applied to the control circuit of the electric valve apparatus as represented by the curve 94, but nevertheless leading with respect to the departure from correspondence represented by the curve 52 by an angle $\phi$.

Thus it will be seen that the synchronizing force lagging with respect to the departure from correspondence, in this case the motor current, which produced the condition of hunting or oscillation about the point of correspondence is changed to a synchronizing force, i. e., motor current that is leading with respect to the departure from correspondence. By integrating the energy expended in the system as represented by the integral of the product of the curves 96 and 52, it will be found that a greater amount of energy is expended in the system as the gun 10 swings away from the position of correspondence than when it is returning to the position of correspondence with the result that the tendency to hunt and oscillate about the position of correspondence is eliminated. Stated in other words, the rate of change in the motor current in passing from positive to negative starts a current flowing in the anti-hunting detector 55. This current flow is, however, delayed by an angle $\theta$ due to the short-circuit connection of the reactive coils in each arm of the alternating current winding of the detector, so that the current flowing in the anti-hunting detector does not become fully effective until the system has about completed its swing to the maximum amplitude. During this out-swing the motor current has developed its full force unchecked by the anti-hunting system whereas on the return swing when the motor tends to impart velocity to the system in returning to the point of correspondence, the motor torque is diminished by the retarding action of the anti-hunting system and therefore the energy accumulated on the return swing is materially diminished so that the system returns with a much slower velocity than it had at the start. Thus if there are oscillations, or if there is any tendency to oscillate, these oscillations or this tendency will be rapidly damped and it has been found in practice possible to adjust the anti-hunting system so that the motor stops deadbeat without any oscillation whatsoever.

The operation of the modifications shown in Figs. 3, 4, and 5 is somewhat similar to that described for the system of Fig. 1 and will be readily understood from the above detailed description of the operation of Fig. 1.

Although in accordance with the provisions of the patent statutes, I have described this invention as embodied in concrete form I would have it understood that the apparatus and connections shown in the several figures of the drawing and described in the specification are merely illustrative and that the invention is not limited thereto since alterations and modifications will readily suggest themselves to persons skilled in the art without departing from the true spirit of this invention or from the scope of the annexed claims.

What I claim as new and desire to secure by Letters Patent of the United States is:

1. In a system wherein a synchronizing force is exerted between a plurality of objects, electrical connections between said objects, means for supplying a current to said connections to produce said synchronizing force comprising electric valve apparatus provided with a control grid, means for supplying a voltage to said grid and means responsive to said current for controlling said voltage to decrease said current as said objects approach correspondence.

2. In a system in which a synchronizing force is exerted between a plurality of interconnected electrical devices, means for supplying a direct current to said devices to produce said synchronizing force comprising electric valve apparatus provided with a control circuit, means for supplying an alternating voltage to said control circuit, means responsive to changes in said current, and anti-hunting means controlled by said current change responsive means for modifying said alternating voltage and reducing the magnitude of said current in accordance with changes in said direct current as said devices approach correspondence.

3. In a system in which a plurality of interconnected electrical devices are arranged to operate in substantial synchronism, means for supplying current to produce a synchronizing force in said system comprising electric valve apparatus provided with a control circuit, means for supplying an alternating voltage to said control circuit, means responsive to said current and means controlled by said current responsive means for controlling the phase of said alternating voltage to reduce the value of said synchronizing force as said devices approach correspondence.

4. In a system in which a plurality of interconnected electrical devices are arranged to operate in substantial synchronism, means for supplying a direct current to said system to produce a synchronizing force comprising electric valve apparatus provided with a control circuit, means for supplying an alternating voltage to said control circuit, and means responsive to said current for reversing the phase of said alternating voltage to control the value of said direct current.

5. A system for driving an object into positional agreement with a controlling object comprising an electric motor for driving the driven object, means for supplying a direct current to said motor comprising electric valve apparatus provided with a control circuit and an output circuit connected to said motor, means for supplying an alternating voltage to said control circuit, means responsive only to changes in said direct current for modifying said alternating voltage so as to reduce said direct current as said objects approach correspondence.

6. A motor control system comprising an electric motor for driving an object, means for supplying a direct current to said motor comprising electric valve apparatus provided with a control circuit and an output circuit connected to said motor, means for supplying an alternating voltage to said control circuit and means responsive to said current for supplying a second voltage to said control circuit to decrease said current as said object approaches a predetermined stopping point and responsive to reversals in the direction of said direct current for reversing the phase of said alternating voltage to control the current supplied to said motor.

7. A system for driving an object into positional agreement with a control object comprising an electric motor for driving the driven object, means for supplying direct current to said motor comprising electric valve apparatus provided with a control circuit and an output circuit connected to said motor, means actuated by said objects and connected to said control circuit for causing said motor to drive said objects into positional agreement, means for supplying an alternating voltage to said control circuit, a transformer connected in circuit with said motor and means supplied from said transformer for controlling said alternating voltage to reduce said motor current as said objects approach correspondence and for reversing the phase of said alternating voltage to control the current supplied to said motor.

8. A system for driving an object into positional agreement with a control object comprising an electric motor for driving the driven object, supply means for said motor comprising electric valve apparatus provided with a control circuit and an output circuit connected to said motor, inductive devices actuated by said objects for supplying an alternating voltage to said control circuit to cause said motor to drive the driven object into positional agreement with the control object, means for supplying a second alternating voltage to said control circuit, and means responsive to the motor current for varying the magnitude of said second voltage in accordance with variations in the magnitude of the motor current and for reversing the phase of said second voltage when the direction of the motor current reverses.

9. In a system in which a synchronizing force is exerted between a plurality of interconnected devices, supply means for producing a synchronizing force comprising electric valve apparatus provided with a control circuit and an output circuit and supply connections from said output circuit to one of said devices, means for supplying alternating voltages to said output circuit and said control circuit, a phase shifting device for varying the phase relationship between said voltages, and means for controlling said control voltage with a dephased voltage derived from said connections.

10. A system for driving an object into positional agreement with a control device comprising an electric motor for driving the driven object, supply means for said motor comprising electric valve apparatus provided with a control circuit and an output circuit connected to said motor, means for supplying alternating voltages to said output circuit and said control circuit, a phase shifting device actuated by said control device for varying the phase relationship between said voltages, and means for controlling said control voltage with a dephased voltage derived from the motor circuit.

11. A motor control system comprising in combination with a control object and a driven object, an electric motor for driving the driven object, supply means for said motor comprising electric valve apparatus provided with a control circuit and an output circuit and connections from said outlet circuit to said motor, means for supplying alternating voltages to said control circuit and output circuit, means actuated by said control object for varying the phase relationship between said voltages to control the speed and direction of rotation of said motor and means for controlling the magnitude and phase of said control voltage with a lagging voltage derived from the motor circuit.

12. A system for driving an object into positional agreement with a control object comprising an electric motor for driving the driven object, means for supplying a direct current to said motor comprising electric valve apparatus provided with a control circuit and connections to said motor, means connected to said control circuit for controlling said supply means to cause said motor to drive the driven object into positional agreement with said control object and for reversing the motor current when the driven object overruns the position of correspondence, means for supplying an alternating voltage to said control circuit, and means for controlling the magnitude and phase reversal of said alternating voltage with a voltage derived from the motor circuit that is lagging with respect to changes in magnitude and direction of said direct current.

13. In a system in which a plurality of interconnected electrical devices are arranged to operate in substantial synchronism, means for supplying current to said devices comprising electric valve apparatus provided with a control circuit, means for supplying an alternating voltage to said control circuit, and a reactance device having a direct current saturating winding controlled by said current and an alternating current winding in inductive relationship with said direct current winding and connected to said control circuit whereby said device is responsive to an electrical operating condition of said system for controlling the phase of said voltage.

14. In a system in which a synchronizing force is exerted between a plurality of interconnected electrical devices arranged to operate in substantial synchronism, means for supplying current to said devices comprising electric valve apparatus provided with a control circuit, means for supplying a voltage to said control circuit, and a reactance device having an alternating current winding connected to said control circuit and a direct current saturating winding for controlling the magnetization of said alternating current winding so that said reactance device is responsive to energization of said interconnected devices for controlling said voltage to control the value of said synchronizing force.

15. A system for driving an object into positional agreement with a control object comprising an electric motor for driving the driven object, means for supplying a direct current to said motor comprising electric valve apparatus provided with a control circuit, means for supplying an alternating voltage to said control circuit, and a reactance device having a reactance winding connected to said control circuit and a direct current saturating winding in inductive relationship with said reactance winding and connected to be responsive to energization of said motor for reversing the phase of said alternating voltage to control the operation of said motor.

16. In a motor control system, an electric motor for driving an object, direct current supply means for said motor comprising electric valve apparatus provided with a control circuit, means for controlling said supply means to cause said motor to drive the driven object into positional agreement with a control object and to reverse the motor current when said driven object overruns the position of correspondence with said control object, means for supplying an alternating voltage to said control circuit, and a reactance device having a direct current saturating winding responsive to said current and a reactance winding in inductive relationship with said direct current winding and controlled thereby so that said reactance device is responsive to the direction of the motor current for controlling the phase of said alternating voltage.

17. In a system wherein a plurality of interconnected electrical devices are arranged to operate in substantial synchronism, supply means connected to supply current to said devices to provide a synchronizing force therebetween comprising electric valve apparatus provided with a control circuit, and a reactance device having a reactance winding connected to a source of alternating voltage and to said control circuit for supplying an alternating voltage to said control circuit and a saturating winding arranged in inductive relationship with said reactance winding and responsive to an electrical condition of said system for controlling said alternating voltage to control the value of said synchronizing force.

18. A system for driving an object into positional agreement with a control object comprising an electric motor for driving the driven object, supply means for said motor comprising electric valve apparatus provided with a control circuit, a reactance device having a reactive winding supplied from a source of alternating voltage for supplying an alternating voltage to said control circuit and a direct current saturating winding arranged in inductive relationship with said reactive winding energized in response to energization of the motor for controlling said alternating voltage to control the current supplied to said motor.

19. A follow-up motor control system comprising a control object an electric motor for driving a driven object into positional correspondence with said control object, means for supplying a direct current to the armature circuit of said motor comprising electric valve apparatus provided with a control circuit, and a reactance device having a reactance winding connected to said control circuit for supplying a voltage thereto and a direct current saturating winding connected to said motor armature circuit and in inductive relationship with said reactance winding for controlling said voltage.

20. A motor control system comprising an electric motor for driving a driven object, means for supplying a direct current to said motor comprising electric valve apparatus provided with a control circuit, control means for causing said motor to drive said driven object into positional agreement with a control object and for reversing the motor current when the driven object overruns the position of correspondence with said control object, and a reactance device having a reactance winding supplied from a source of alternating voltage and connected to said control circuit for supplying an alternating voltage thereto and a direct current control winding connected to said motor circuit and arranged in inductive relationship with said reactance winding for controlling the phase and magnitude of said alternating voltage.

21. In a system in which a plurality of interconnected electrical devices are arranged to operate in substantial synchronism, supply means comprising electric valve apparatus provided with a control circuit and connected to one of said devices to provide a synchronizing force between said devices, a reactance device having a plurality of control windings connected to form a bridge energized in response to energization of one of said devices and connected to a source of direct current and having a plurality of reactance windings connected to form a bridge, and connections from said reactance winding bridge to a source of alternating voltage and to said control circuit.

22. A system for driving an object into positional agreement with a control object comprising an electric motor for driving the driven object, supply means for said motor comprising electric valve apparatus provided with a control circuit, a reactance device having a plurality of control windings connected to form a bridge and a plurality of reactance windings connected to form a bridge and arranged in inductive relationship with said control windings, connections from said control winding bridge to the motor circuit and to a source of direct current, and connections from said reactance winding bridge to a source of alternating voltage and to said control circuit.

23. A system for driving an object into positional agreement with a control object comprising an electric motor for driving the driven object, supply means for said motor comprising electric valve apparatus provided with a control circuit, a reactance device having a plurality of control windings connected to form a bridge and a plurality of reactance windings connected to form a bridge and arranged in inductive relationship with said control windings, connections from one diagonal of said control winding bridge to a source of direct current and from the other diagonal thereof to the motor circuit, and connections from one diagonal of said reactance winding bridge to a source of alternating voltage and from the other diagonal thereof to said valve apparatus control circuit.

24. In a system in which a plurality of interconnected electrical devices are arranged to operate in substantial synchronism, means for supplying direct current to one of said devices to provide a synchronizing force comprising electric valve apparatus provided with a control circuit and connections to one of said devices, a reactance device comprising a plurality of direct current control windings connected to form a bridge and a plurality of reactance windings connected to form a bridge, each of the arms of said control winding bridge comprising a plurality of windings connected in series relationship and each of the arms of said reactance winding bridge comprising a plurality of windings connected in parallel and arranged in inductive relationship with corresponding windings of said control winding bridge, connections from a source of alternating voltage to one diagonal of said reactance winding bridge and from the other diagonal thereof to said control circuit for supplying an alternating voltage thereto, and connections from one diagonal of said control winding bridge to a source of direct current and from the other diagonal thereof to said supply connections for controlling the alternating voltage supplied to said control circuit with a voltage derived from said supply connections.

25. A system for driving an object into positional agreement with a control object comprising an electric motor for driving the driven object, means for supplying a direct current to said motor comprising electric valve apparatus provided with a control circuit, a reactance device having a plurality of control windings connected to form a bridge and a plurality of reactance windings connected to form a bridge, each of the arms of said reactance winding bridge comprising a plurality of windings connected in parallel and each of the arms of said control winding bridge comprising a plurality of windings arranged in inductive relationship with corresponding windings of said control winding bridge and connected in series to have respectively reverse polarity with respect to said corresponding inductively related windings, connections from one diagonal of said reactance winding bridge to a source of alternating voltage and from the other diagonal thereof to said control circuit for supplying an alternating voltage thereto, and connections from one diagonal of said control winding bridge to a source of direct current and from the other diagonal thereof to said motor circuit for controlling said alternating voltage with a dephased voltage derived from the motor circuit.

26. In a system in which a synchronizing force is exerted between a plurality of interconnected electrical devices, supply means for producing said synchronizing force comprising electric valve apparatus provided with a control circuit and connections to said system, a reactance device having a reactance winding connected to said control circuit and a direct current magnetization control winding and a transformer connected to said control winding and to said connection whereby said reactance device is responsive only to a change in an electrical condition of said system for controlling the supply of voltage to said control circuit.

27. In a system in which a synchronizing force is exerted between a plurality of interconnected electrical devices, supply means for producing said synchronizing force comprising electric valve apparatus provided with a control circuit and supply connections to one of said devices, means for supplying a voltage to said control circuit, a reactance device having a reactance winding and a direct current magnetization control winding in inductive relationship therewith for controlling said voltage, and connections from said control winding to said supply connections including a transformer whereby said device is responsive only to changes in an electrical condition in said supply connections.

28. A system for driving an object into positional agreement with a control object comprising an electric motor for driving the driven object, supply means for said motor comprising electric valve apparatus provided with a control circuit and connections to said motor, means for supplying a voltage to said control circuit, a reactance device having a reactive winding and a magnetization control winding for controlling said voltage and connections from said control winding to the motor circuit including a transformer whereby said reactance device is responsive only to a change in an electrical condition of said motor circuit.

29. A system for driving an object into positional agreement with a control object comprising an electric motor for driving the driven object, means for supplying a direct current to said motor comprising electric valve apparatus provided with a control circuit and connections to said motor, means for supplying a voltage to said control circuit, a reactance device having a reactance winding connected to said control circuit and a magnetization control winding for controlling said voltage, and connections from said control winding to the motor circuit including a transformer whereby said reactance device is responsive only to a change in said direct current.

30. A system wherein a synchronizing force is exerted between a plurality of interconnected devices and wherein one of said devices is a dynamo electric machine, means for supplying current to produce said synchronizing force comprising electric valve apparatus provided with a control circuit and an output circuit connected to said machine, means for supplying an alternating voltage to said control circuit, a reactance device having a reactance winding connected to said control circuit and having a magnetization control winding, and connections including a transformer from said control windings to said dynamo electric machine whereby said reactance device is responsive to the rate of change of said current for controlling said alternating voltage.

31. A system for driving an object into positional agreement with a control object comprising an electric motor for driving the driven object, means for supplying direct current to said motor comprising electric valve apparatus provided with a control circuit and an output circuit connected to said motor, means for supplying an alternating voltage to said control circuit, and a reactance device connected so as to be responsive to the rate of change of said direct current for controlling the phase of said alternating voltage.

32. A motor control system comprising in combination with a control object and a driven object an electric motor for driving the driven object, supply means for said motor comprising electric valve apparatus provided with a control circuit and an output circuit connected to said motor, means for supplying an alternating voltage to said control circuit, control means actuated by said objects for controlling said motor to drive said objects into positional agreement, means for supplying a second alternating voltage to said control circuit in predetermined phase relationship with said first alternating voltage, and a reactive device connected so as to be responsive to the rate of change of the motor current for controlling the phase and magnitude of said second alternating voltage.

33. In a positional or follow-up control for power motors for positioning an object with respect to the position of a controlling object, the combination with the controlling object and a controlled object driven therefrom, of means for producing an electro-motive force varying in magnitude and direction with the position of said controlled object, a pair of grid-glow tubes, a phase-shifting device between said means and said grid-glow tubes variable with the output of said means and adapted to shift oppositely the phase of the grids of said glow tubes, an A. C. supply for said tubes, and a reversible motor for driving said controlled object and governed as to direction and torque by the output of said rectifier tubes.

34. A follow-up control system comprising in combination a pilot device, a driven object, driving means for said object, means responsive to positional disagreement of said pilot device and driven object for controlling said driving means to drive said object toward correspondence with said pilot device, and means responsive to the rate of change of torque of said driving means for controlling said driving means to prevent hunting.

35. A follow-up control system comprising in combination, a pilot device, a driven object, driving means for said object, control means for said driving means, means responsive to positional disagreement of said pilot device and driven object for actuating said control means to control said driving means to drive said object toward correspondence with said pilot device, and anti-hunting means responsive to the rate of change of torque of said driving means for actuating said control means.

36. A follow-up control system comprising in combination a pilot device, a driven object, driving means for said object, means for controlling the energization of said driving means, means responsive to positional disagreement of said pilot device and driven object for actuating said control means to control said driving means to produce a torque for driving said object toward correspondence with said pilot device, and anti-hunting means for actuating said control means in accordance with the rate of change of said torque.

37. A positional control system comprising a motor, a controlled object driven therefrom, a controlling object, means for creating an electric signal variable in accordance with the relative displacement of said objects, means for deriving from the counter E. M. F. of said motor an electric signal variable in accordance with the speed thereof, and amplifying means receiving and jointly controlled by said two electric signals, said amplifying means supplying a potential proportional to the combination of said signals to control the operation of said motor.

38. In a positional control system, a rotatable controlling object, a controlled ponderable object rotatably positioned therefrom, a servo motor for operating said ponderable object, thermionic relay means for controlling the operation of said motor, means creating an electrical signal variable in accordance with the relative displacement of said objects for applying a primary signal to said relay means, and an electrical feed back connection from said motor to said thermionic relay means, said connection employing the counter E. M. F. of said motor to prevent hunting of said motor and ponderable object.

39. A positional control system comprising a controlling object, a controlled object, a reversible motor for driving said controlled object into positional agreement with the controlling object, electronic means for controlling the operation of said motor, means for generating and applying to said electronic means an electric signal of reversible phase proportional to the positional disagreement of said controlled and controlling objects, and means for applying to said electronic means a potential derived from the counter E. M. F. generated by said motor in a sense to oppose the effect of said displacement signal when said controlled object lags behind said controlling object.

ERNST F. W. ALEXANDERSON.

REFERENCES CITED

The following references are of record in the file of this patent:

UNITED STATES PATENTS

| Number | Name | Date |
|---|---|---|
| 1,684,137 | Mittag | Sept. 11, 1928 |
| 1,684,138 | Nixdorff | Sept. 11, 1928 |
| 1,703,317 | Minorsky | Feb. 26, 1929 |
| 1,811,860 | Morton | June 30, 1931 |
| 1,851,692 | Zucker | Mar. 29, 1932 |
| 1,921,983 | Wittkuhns | Aug. 3, 1933 |

FOREIGN PATENTS

| Number | Country | Date |
|---|---|---|
| 703,178 | France | Feb. 2, 1931 |